United States Patent [19]

Zenner

[11] Patent Number: 5,355,664
[45] Date of Patent: Oct. 18, 1994

[54] CASTER WHEEL SUSPENSION AND SHAFT TENSIONING SYSTEM FOR TURF MAINTENANCE EQUIPMENT

[75] Inventor: Michael N. Zenner, Dakota County, Minn.

[73] Assignee: The Toro Company, Bloomington, Minn.

[21] Appl. No.: 994,494

[22] Filed: Dec. 21, 1992

[51] Int. Cl.5 .................... A01D 34/00; A01D 67/00
[52] U.S. Cl. ................... 56/15.8; 56/DIG. 3; 56/DIG. 10; 16/35 D
[58] Field of Search ................ 56/15.7, 15.8, DIG. 3, 56/DIG. 10; 16/35 D

[56] References Cited

U.S. PATENT DOCUMENTS

| | | |
|---|---|---|
| 2,347,524 | 4/1944 | Swan . |
| 2,490,560 | 12/1949 | Urquhart, Jr. ............... 16/35 D |
| 2,761,692 | 9/1956 | Sisulak . |
| 2,889,153 | 6/1959 | Kowalik . |
| 3,194,578 | 7/1965 | Kiecker . |
| 3,654,999 | 4/1972 | Fischer . |
| 4,432,116 | 2/1984 | Schultz ..................... 16/35 D |
| 4,747,257 | 5/1988 | Hutchison ................ 56/15.8 |
| 4,930,298 | 6/1990 | Zenner ...................... 56/17.4 |
| 5,167,048 | 12/1992 | Geiger et al. ............. 16/35 D |
| 5,221,100 | 6/1993 | McNutt ...................... 280/78 |

FOREIGN PATENT DOCUMENTS 223100 3/1958 Australia .................. 16/35 D

*Primary Examiner*—Mark Rosenbaum
*Assistant Examiner*—John M. Husar
*Attorney, Agent, or Firm*—Johnson & Krull

[57] ABSTRACT

A rotary mower (22) having an improved castering wheel assembly (39, 92) so as to reduce rotation of the castering wheel (4) about its support shaft (6). In one embodiment, a torsion resistance mechanism (2) is interposed between the shaft (3) and mower frame (67), the torsion resistance mechanism (2) including a resilient material (46) rigidly bonded to a sleeve (77) in which the shaft (3) is retained. The resilient material (46) is press fit into a housing (11), the housing (11) being rigidly bonded to the mower frame (67). In another embodiment, a cap (98) housing a spring (102) is threadably attached to the castering wheel support shaft (81). Rotation of the cap (98) compresses spacers (85–90) mounted co-axially on the shaft (81) while urging the shaft (81) in an upward direction (111) so as to prevent axial rotation of the shaft (81) when the castering wheel loses contact with the ground.

20 Claims, 7 Drawing Sheets

CASTER WHEEL SUSPENSION AND SHAFT TENSIONING SYSTEM FOR TURF MAINTENANCE EQUIPMENT

FIELD OF THE INVENTION

The invention relates generally to pivotable or castering wheels or rollers, and more particularly to apparatus and methods for restraining to varying degrees the rotational and axial motion of such wheels or rollers when used in conjunction with turf maintenance equipment.

BACKGROUND OF THE INVENTION

Castering wheels are used on many types of turf maintenance and harvesting equipment. Although the present invention could be used in conjunction with turf maintenance machines and harvesters of any type, for the sake of brevity the invention will be described in terms of a turf mowing machine having one or more rotary cutting units or decks. In a preferred embodiment, the present invention can be used most advantageously as a component of riding rotary mowers. In order to better understand the somewhat unique demands that are placed on castering wheels used on mowing equipment, a brief discussion of rotary mower structures and geometry is necessary.

Larger rotary riding mowers typically include a traction vehicle supported by a plurality of wheels; a prime mover connected through a transmission to one or more of the wheels; one or more rotary decks having mechanically or hydraulically driven blades; and one or more lift arms (or analogous structures) pivotally connected to the traction vehicle suitable for supporting the deck(s). Lift arms are so termed because they lift the decks from their normal operating positions to their transport positions. An example of a rotary mower of this type is disclosed in U.S. Pat. No. 4,854,112, issued to Holley, et al, and which is illustrated generally in FIG. 6 herein.

The mower 10 includes a traction vehicle 12 supported by a pair of front drive wheels 14 and a pair of rear steerable wheels 16. Traction vehicle 12 also carries a prime mover connected through a transmission to drive wheels 14. Traction vehicle 12 supports a front deck 18 and a pair of wing decks 20a and 20b, the blades of which are driven either hydraulically or through a power take-off (PTO) to the prime mover. The decks 18, 20 are shown in their cutting positions in solid line; and in their transport positions in phantom line.

Referring to FIG. 6, the preferred characteristics or features of a rotary deck or cutting unit support system can be appreciated. In the cutting position, the cutting units 20a and 20b are preferably "floated" relative to the traction vehicle 12. That is, the cutting units 20a and 20b are preferably independently and separately supported by the traction vehicle 12 so that they can follow the contours or undulations of the ground regardless of the gross motion of the traction vehicle 12. If cutting units 20a and 20b are not supported in a floating manner, they tend to scalp the higher regions and miss the lower regions. While non floating cutting units might be acceptable for residential use, certainly golf course and estate maintenance require that the cutting units individually follow the subtle variations of the ground to maintain a consistently good cut across the entire swath, regardless of the immediate topography encountered by each individual cutting unit.

The connection between the cutting units and the traction vehicle must also permit lifting of the cutting units from their lowered cutting positions to a raised "transport" position (shown in phantom in FIG. 6). This "transport" position permits the operator to temporarily raise one or more of the cutting units 20a and 20b in order to mow a narrower swath or to pass through a gate or between trees. Also, it is occasionally necessary to drive mowing machines over conventional road surfaces, at which time it is important to raise the cutting units 18, 20a and 20b to a transport position since they are not entirely suitable for repeatedly running up and down over curbs, nor for travel over paved streets at anything approaching the speed of ordinary traffic. In view of this, most riding mowers, such as the one illustrated in FIG. 6, include mechanisms which can raise the cutting units upward and toward the traction vehicle. Although the castering wheels on both decks 18 and 20 are subject to unique operating conditions, the wing decks 20a and 20b consistently place the greatest demands on the castering wheels. The following discussion of deck 20 is, however, also generally applicable to front deck 18. The deck 20 can "float" relative to traction vehicle 12. The struts 40 which support deck 20 are rollably supported at either end by casters 42, the casters 42 serving as ground following devices establishing the height of cut of deck 20. That is, as casters 42 follow ground undulations, struts 40 and housing 24 also "pitch", "roll", "yaw" and translate vertically depending on the terrain. In the mowers heretofore known, the casters 42 are typically free to rotate a full 360 degrees about their support shaft (i.e., vertical) axis.

In the cutting mode, the free rotation of the casters presents several problems. First, the casters should follow (i.e., roll) in the direction of the traction unit. However, due to turning movements of the traction unit or uneven terrain, one or more caster wheels may become substantially misaligned or "cocked" with respect to the drive wheels 14, as may be clearly seen in FIG. 6. When the caster wheel returns to ground contact in such a misaligned state, an instantaneous scraping or scuffing of the turf occurs. Such scuffing is unacceptable in many settings, such as on a golf course. Also, as can be seen by viewing the raised position of deck 20b, the caster wheels 112 and 113 tend to become perpendicularly aligned to their normal ground track due to minute imbalances in each individual caster. When the deck is lowered, the casters initially remain substantially perpendicular to the desired direction of travel. Since the raising and lowering of the deck typically occurs while the mower is in motion (e.g., 12 mph), significant, repeated scuffing can occur. Further, the shock can sometimes be great enough to pull the caster wheel tire from the wheel rim or at least damage the tire.

Other problems with a conventional, freely rotating caster wheel can also occur. If the deck is raised only slightly (for example, to less than a 45 degree angle with respect to a horizontal plane), the minute imbalance of each caster causes the caster to rotate about its support shaft axis, often continuously, thereby becoming a disturbing source of noise. Also, some decks are supported by four separate castering wheels, since the typical terrain is not perfectly flat, one caster wheel is usually suspended above the ground. The "uneven" wheel tends to rotate about its support shaft, creating noise and the potential for scuffing. As can be seen in FIG. 6, the particular geometry of some mowers causes the clearance between drive wheel 14 and caster wheel 42 to be quite small. This is because the designers want the casters to be as close as possible to the cutting blades to enhance ground following. In these situations, caster wheel 42 can actually collide with drive wheel 14, causing caster wheel 42 to momentarily stop rolling along the ground, creating further scuffing of the turf.

Further, the conventional caster support shaft resides within its supporting collar with only lubricant separating the two metal surfaces. Such an arrangement permits lateral loads and vibration affecting the caster wheel to be transmitted directly to the deck itself without any intervening shock absorption. Thus, the castering wheel promotes early deterioration of the deck frame due to twisting and vibration induced stress relief cracks.

As mentioned earlier, the caster wheels serve as the primary means of establishing the height of cut of the rotary blades. In FIG. 6, no particular caster wheel height adjustment mechanism is depicted. Referring to FIG. 2, however, one can view a conventional height adjustment scheme. As seen at castering wheel 4, a fork 5 is rigidly affixed to a shaft 6 which passes through sleeve 7. A series of spacers or "c" rings 50, 51, 52, 53, 54 and 55 is stacked above sleeve 7, the uppermost spacer 50 abutting cotter pin 56. In order to make height adjustments, spacers are removed as needed from above sleeve 7 and placed below sleeve 7 in the region 57. In this way, sleeve 7 is raised above fork 5, thereby incrementally raising deck 58 above surface 59.

In practice, this arrangement presents several disadvantages, insofar as the overall height of the spacer stack (plus the height of sleeve 7 ) does not perfectly match the distance between the upper surface 60 of fork 5 and the cotter pin 56. The stack of spacers is therefore free to rattle. When castering wheel 4 is in motion, this imperfect fit can contribute to shimmying of wheel 4. Such a washer arrangement does virtually nothing to frictionally resist 360 degree rotation of wheel 4 about the axis defined by shaft 6 when deck 58 is raised for transport, and performs a shock transferring, rather than a shock absorbing, function.

Efforts to prevent caster wheel shimmy have been attempted in the past, as is most notably exemplified in U.S. Pat. No. 2,761,692, issued to Sisulak. The Sisulak device requires the use of three springs and a casting containing three parallel bores in order to urge continuous contact between a castering wheel and the ground over which it travels (see Sisulak at column 1, lines 47–54; column 3, lines 37–2). The complexity of the Sisulak device tends to negate the inherent advantage of the castering wheel, namely, its low cost and ease of manufacture. In most cases, it is preferable to permit 360 degree (or some substantial amount) castering in order to accommodate sharp turns of the mower; however, because of space limitations this may not always be possible. Thus a need exists to preserve some of the advantages of a castering wheel of relatively simple design while providing some degree of shock absorption to the mower deck, some restraint on uncontrolled rotation of the castering wheel about its supporting shaft, both when in and out of contact with the ground, and finally to provide some resistance to shimmying and vibration, all while permitting the castering wheel to serve as a convenient means of adjusting the height of cut in a turf maintenance device.

SUMMARY OF THE INVENTION

According to one embodiment, the present invention broadly includes an improved castering wheel assembly for use with a turf maintenance device, the castering wheel assembly having a torsional resistance mechanism which resists rotation of the castering wheel about its generally vertical support shaft. The torsional resistance mechanism also provides some degree of shock absorption between the castering wheel and the mower deck frame, especially to lateral (i.e. substantially horizontally acting) loads placed upon the wheel. The torsional resistance mechanism restricts maximum angular rotation of the castering wheel support shaft to approximately twenty degrees under normal or typical loads.

Another embodiment of the present invention addresses the problem of shimmy and vibration in a castering wheel by placing a tensile load on the castering wheel support shaft. The tensile load is imparted to the shaft by means of a spring loaded cap, the cap being threadably engaged with an end of the support shaft opposite the castering wheel. Rotation of the cap, preferably by hand, provides a means for applying a tensile load to the shaft. The spring within the cap presses against an internally retained washer, the washer abutting the external spacers which surround the support shaft and which may be conveniently removed or inserted as a means of cut height adjustment. The cap washer tends to compress the spacers, thereby preventing vibratory movement of the spacers. The spring urges the castering wheel upwardly toward the shaft support sleeve. When the cap is tightened, it provides a frictional force between the castering wheel fork and the support sleeve so as to prevent rotation of the castering wheel about the support shaft axis whenever the castering wheel loses contact with the ground, such as would occur when traveling over uneven terrain or during the mower transport mode.

Additional features and aspects of the invention are described in detail below with reference to the drawings.

BRIEF DESCRIPTION OF THE DRAWING

With reference to the Figures, wherein like numerals represent like parts and assemblies throughout the several views.

DETAILED DESCRIPTION OF THE INVENTION

Figure 1:
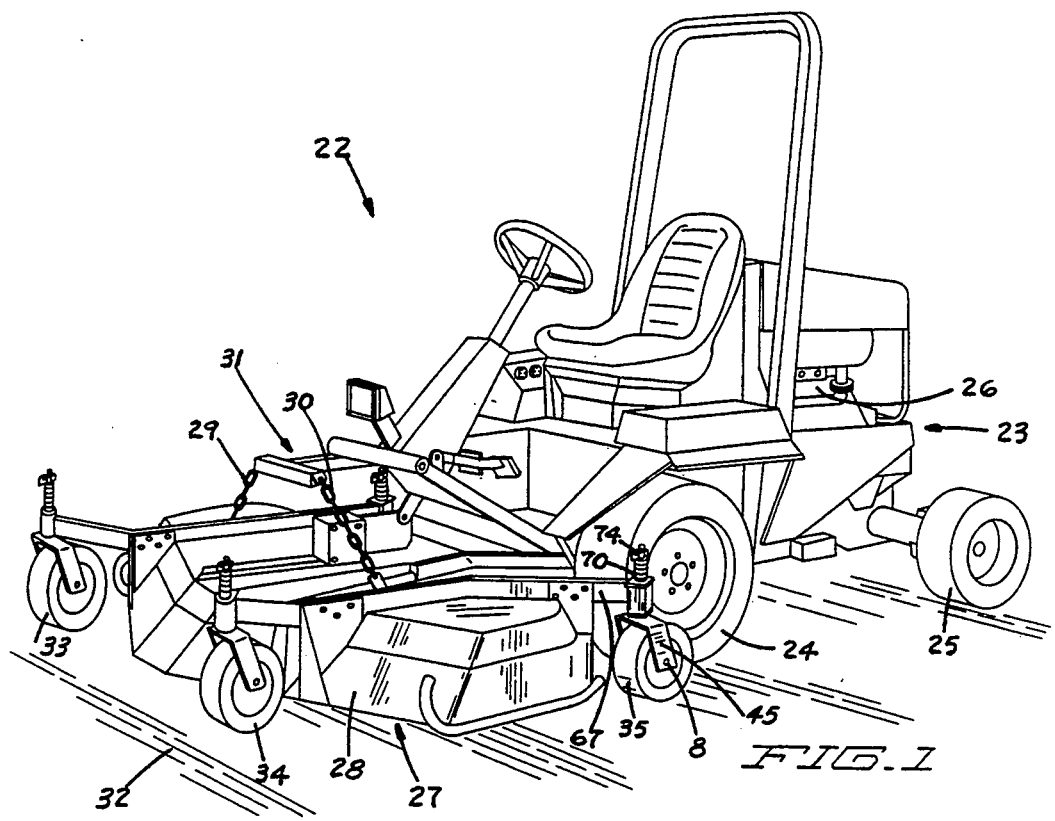
FIG. 1 is perspective view of a mower embodying a first embodiment of an improved caster assembly constructed in accordance with the principles of the present invention.
Figure 2:
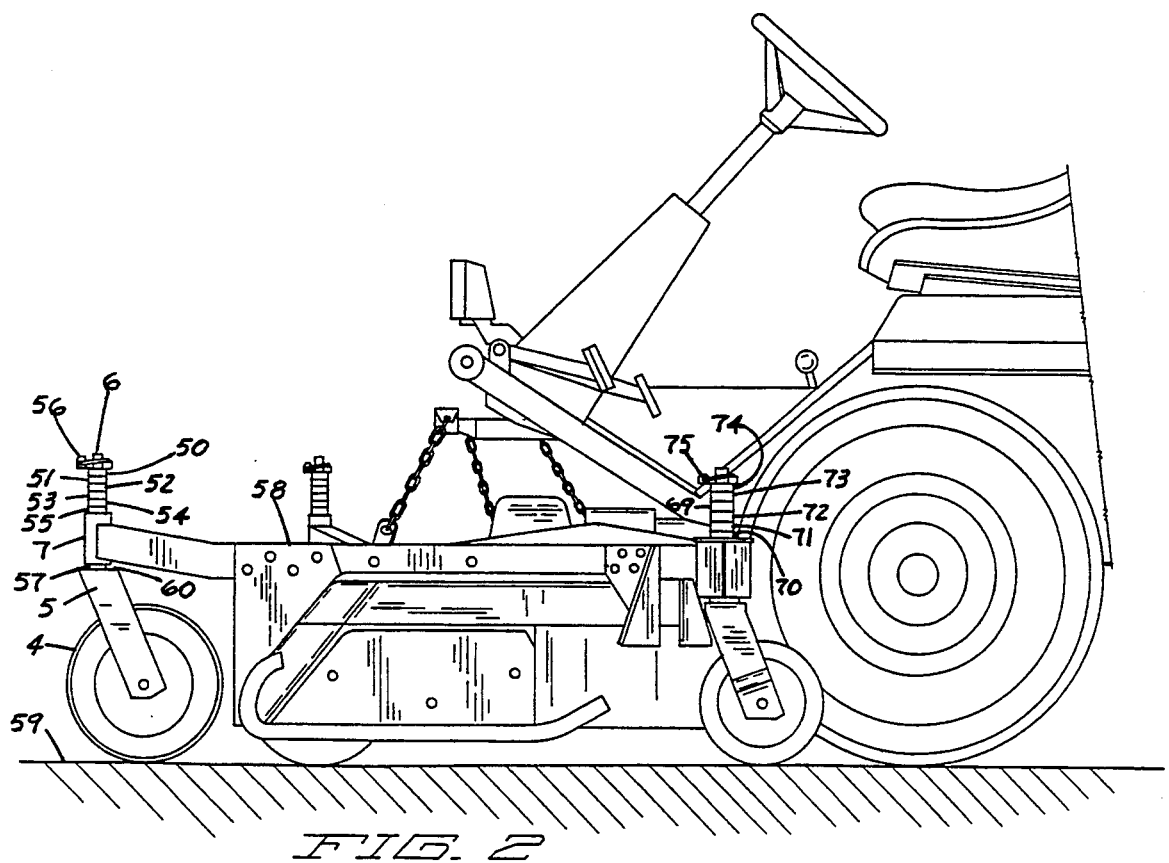
FIG. 2 is side elevational view of a forward portion of the mower depicted in FIG. 1.

With reference to the drawings, wherein like reference numerals designate like parts and assemblies throughout the several views, FIG. 1 shows a perspective view of a mower 22 embodying a first embodiment of an improved caster wheel assembly constructed in accordance with the principles of the present invention. Mower 22 includes a traction vehicle 23 supported by a pair of front drive wheels 24 and a pair of rear steerable wheels 25. Traction vehicle 23 also carries a prime mover 26 connected through a transmission (not shown) to drive wheels 24. Traction vehicle 23 supports a front deck 27, the blades (not shown) of which are driven either hydraulically or through a power take-off (PTO) to the prime mover 26.

Figure 6:
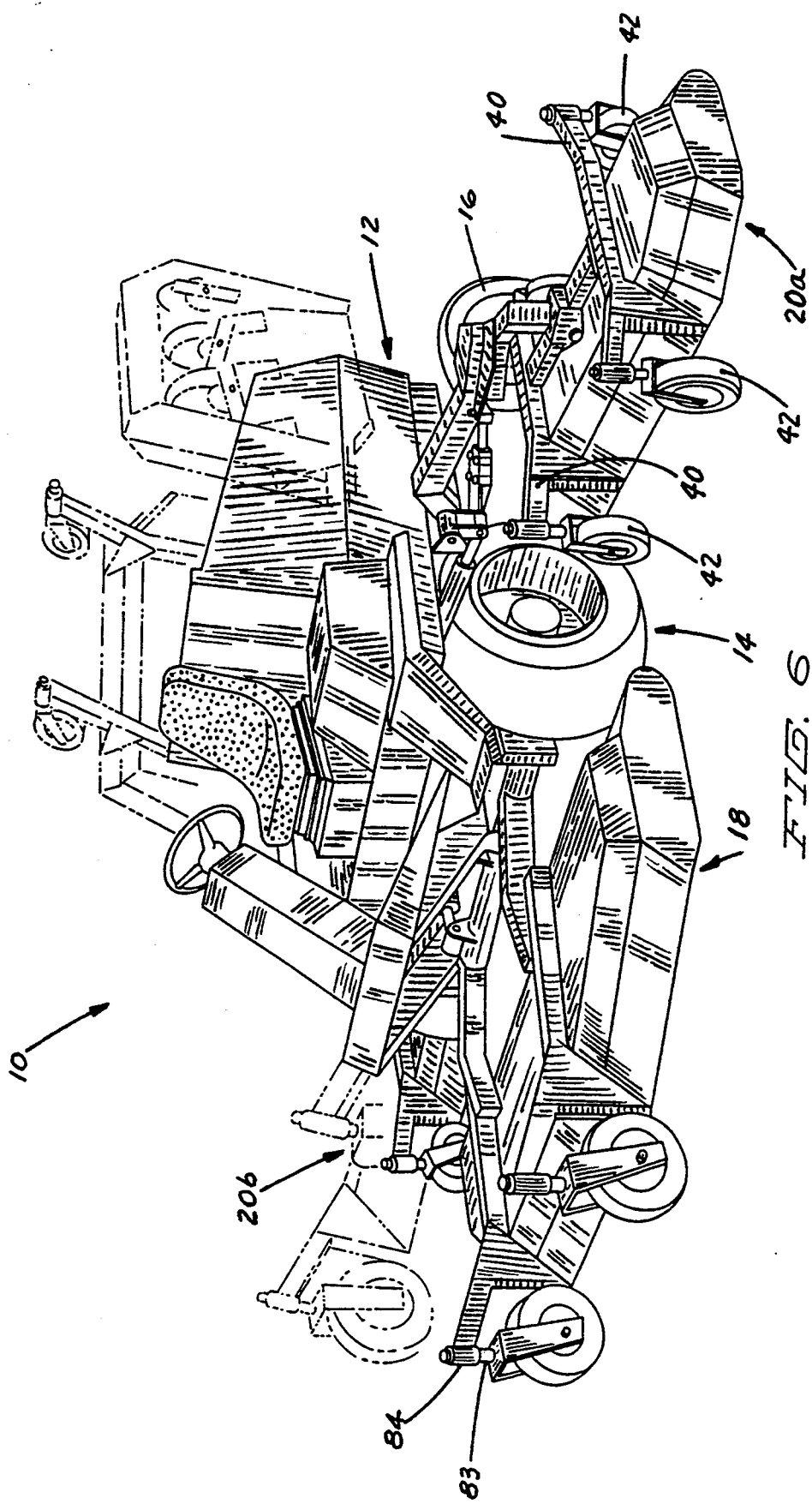
FIG. 6 is a perspective view of a prior art mower.

Although not present in the mower 22 of FIG. 1, the side or wing deck structures 20a and 20b depicted in FIG. 6 could also be incorporated onto the structure of mower 22. The improved caster wheel assemblies which are the subject of the present invention could just as advantageously be employed on the wing deck structures as they are on the front deck 27, were such wing deck structures present.

Front deck 27 includes a front deck housing 28. In a preferred commercial embodiment, the cutting width of front deck 27 is either 62 inches or 72 inches. In each instance, the front deck 27 is supported generally by chains 29 and 30, which are cooperatively connected to boom assembly 31, and which are typically loose or slack during normal mowing operations. The precise position of front deck 27 above the terrain 32 is dependent on the instantaneous location of front castering wheels 33 and 34 as well as by two rear castering wheels, of which only castering wheel 35 is depicted here. Front castering wheels 33 and 34 are of completely conventional construction as can be appreciated with reference to FIG. 3, in which castering wheel 34 is shown (in phantom) to be capable of freely rotating a full 360 degrees about its support shaft 36. As may also be seen in FIG. 3, rear castering wheel 35 cannot be permitted a similar freedom of axial rotation due to the close proximity of drive wheel 24.

Rear castering wheel 35 is cooperatively connected to a torsional resistance mechanism which limits its rotational movement 37 to approximately ten degrees (under typical loads) on each side of a longitudinal center line 38. Under nominal conditions, the torsional resistance mechanism urges or biases the wheel 35 to assume a given azimuthal orientation, or more specifically, to follow a neutral path (i.e. along longitudinal center line 38).

Figure 7:
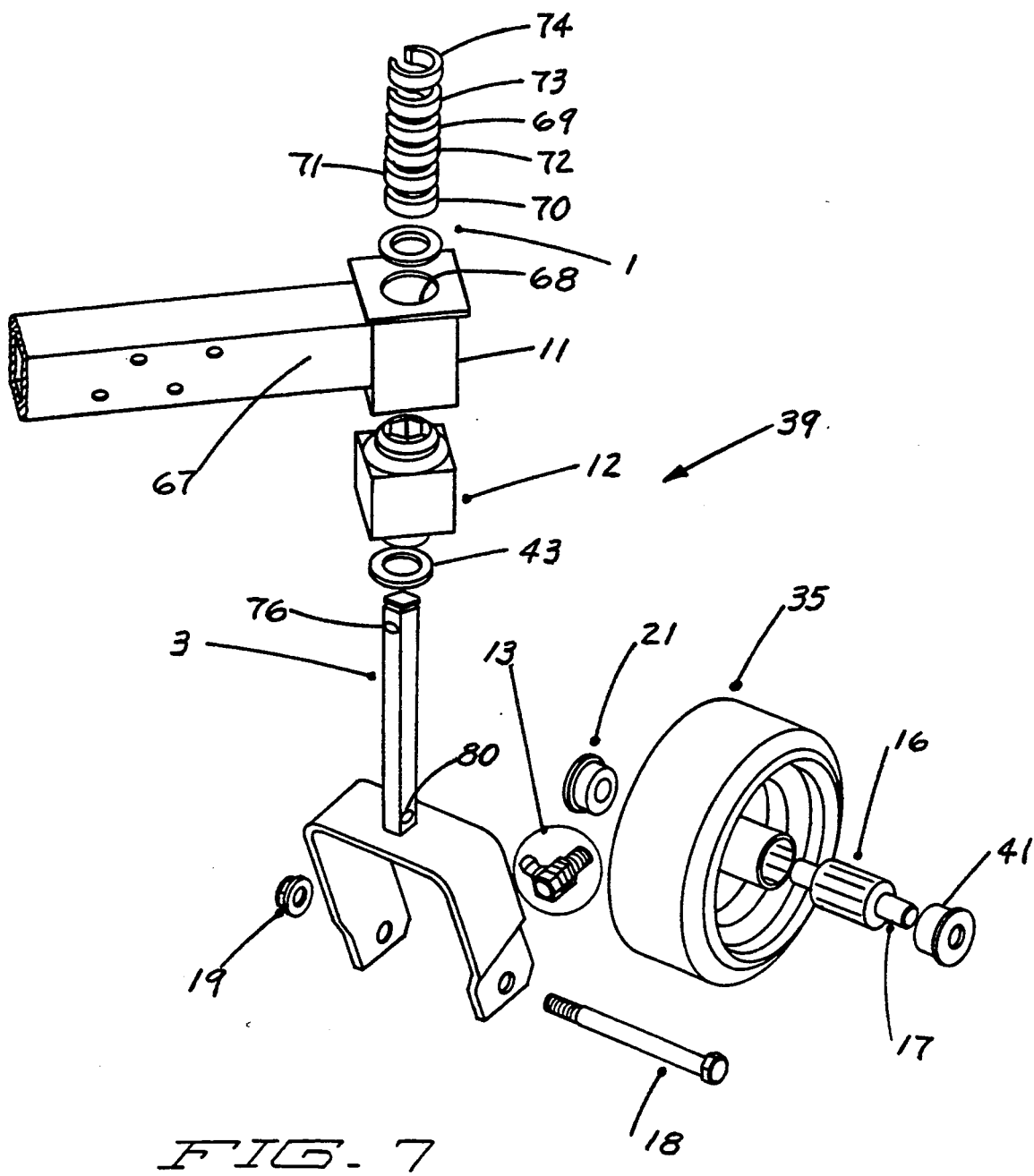
FIG. 7 is an exploded perspective view of an improved castering wheel assembly gas depicted in the mower of FIG. 1.

Referring now to FIG. 7, the entire castering wheel assembly 39 may be viewed in exploded view. The castering wheel 35 is supported axially by roller bearing 16 and end bushings 21 and 41. Lubrication of bearing 16 is permitted by grease fitting 13. The castering wheel 35 is laterally secured within fork 45 (while permitting free rotation of wheel 35 about the lateral axis, namely, its axle) by screw 8 and nut 19, with screw 8 serving as the axle or lateral axis for castering wheel 35. A hexagonal shaft 3 extends outwardly from fork 45, passing first through washer 43 and subsequently through the central bore 44 of torsional resistance member 2. The combination of the aforementioned components, including primarily the wheel 35, axle 8 and fork 45 are, in conventional castering wheel arrangement, free to rotate as an assembly about the axis (typically vertical) established by shaft 3.

Figure 4:
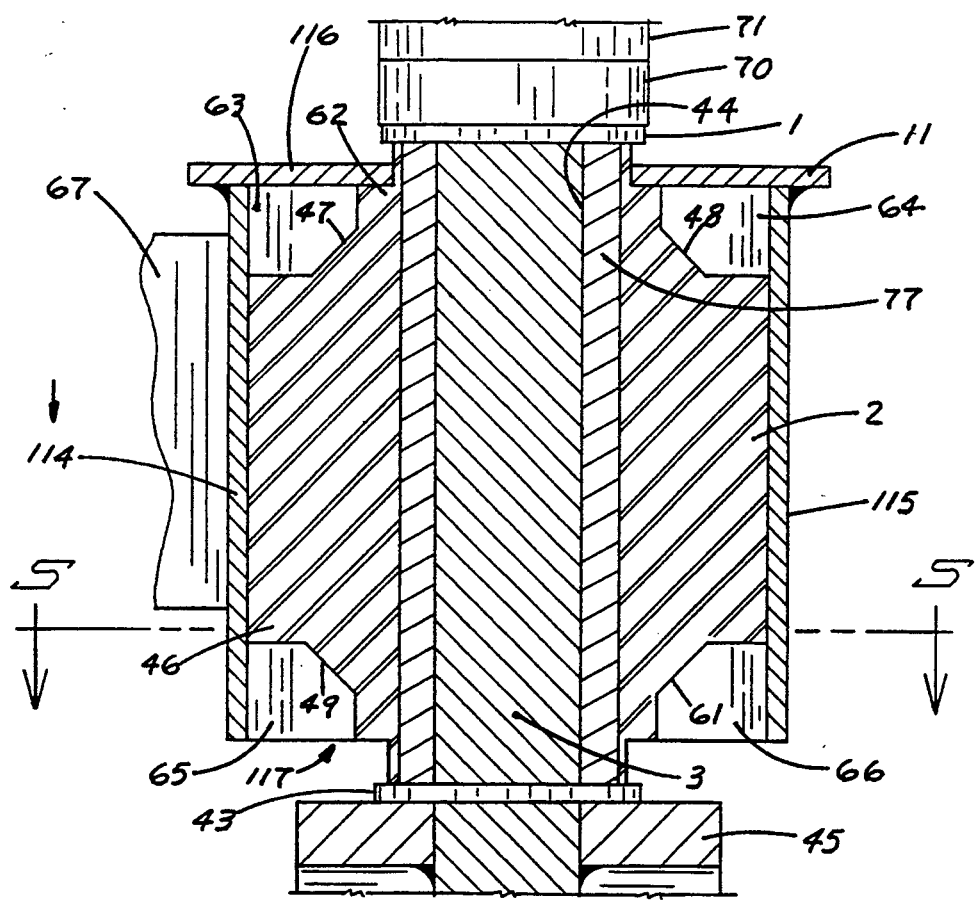
FIG. 4 is an enlarged sectional view taken generally along line 4—4 of FIG. 3.
Figure 5:
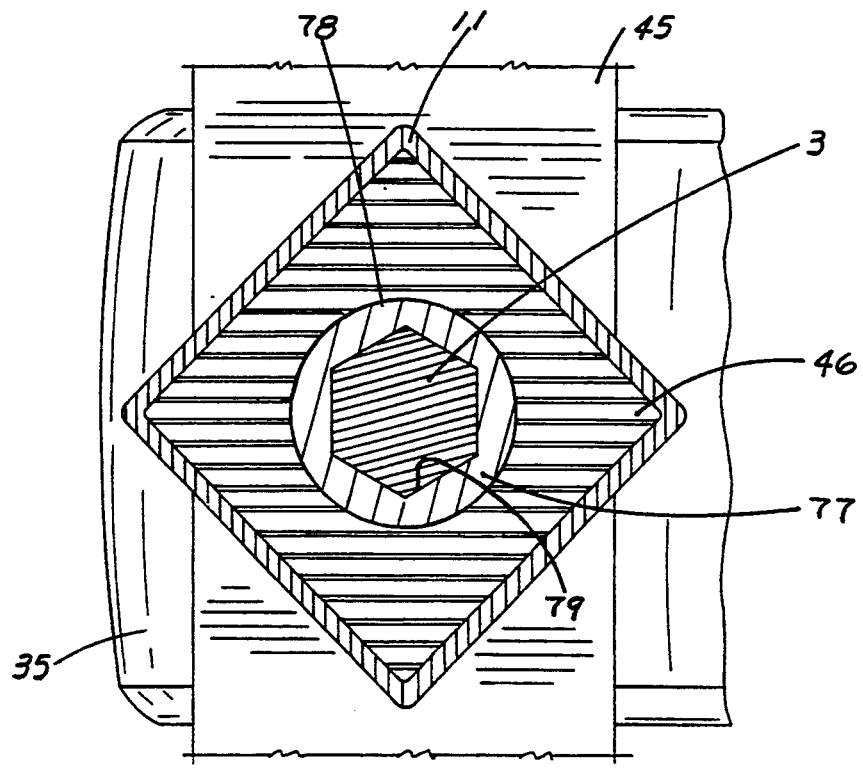
FIG. 5 is a sectional view taken generally along line 5—5 of FIG. 4.

Referring also to FIGS. 4 and 5, the torsional resistance member 2 is seen to include an outer, resilient region 46, which is shaped generally as a rectangular block which transitions via sloping sides 47, 48, 49, and 61 to form a cylindrical housing 62 for center bore 44. The resilient regions 46 of torsional resistance member 2 are preferably formed of a substance such as rubber having a durometer of approximately sixty five. The torsional resistance member 2 can be formed in any convenient shape that would permit the exterior surfaces to be gripped or retained within a suitable housing. A torsional resistance member similar to the one depicted here is manufactured by Lord Industrial Products in Erie, Pa. When in use on the mower 22, the torsional resistance member is retained within housing 11 by means of a press fit. As can be seen in FIG. 4, the interior of housing 11 occupies the shape of a rectangular solid, creating void regions 63, 64, 65 and 66 adjacent to the tapering sidewalls 47, 48, 49 and 61, respectively. The housing 11 is preferably formed with sidewalls 114 and 115, as well as a lid 116, with a substantially "open" bottom portion 117.

The housing 11 is rigidly affixed in some manner, such as by welding, to deck support strut 67. The shaft 3 passes sequentially through orifice 65 of housing 11, as well as washer 1 and spacers 69, 70, 71, 72, 73 and 74. The shaft 3 is ultimately secured by means such as a cotter pin 75 which passes through orifice 76 near one end of shaft 3. Although all of the spacers 69–74 are shown here residing on shaft 3 after shaft 3 has exited housing 11, in practice some spacers may reside on shaft 3 prior to the point (or plane) where shaft 3 enters housing 11. In this manner, a means of adjusting the cut height of deck 27 is provided.

The central bore 44 of torsional resistance mechanism 2 is defined by sleeve 77, which is preferably formed from some hard, wear resistant material, such as steel. The outer perimeter 78 of sleeve 77 is substantially circular, and is permanently bonded to resilient region 46. The interior perimeter 79 of sleeve 77 is preferably formed as a hexagon, thereby mating with and restraining torsional movement of hexagonal shaft 3. The fit between the shaft and sleeve permits free axial movement of the shaft for cut height adjustment purposes. The cross section of shaft 3 and sleeve 77 may be of any convenient geometry which causes torsional loads imposed on shaft 3 to be transferred, via sleeve 77, to the resilient material 46. This requirement will typically be satisfied by any mating and securing arrangement between sleeve 77 and shaft 3 which limits the movement of shaft 3 to a single degree of freedom. In a preferred embodiment, the distance between parallel sides of shaft 3 is approximately 1.125 inch, while the distance between parallel sides of sleeve inner perimeter 79 is approximately 1.130 inch.

Figure 3:
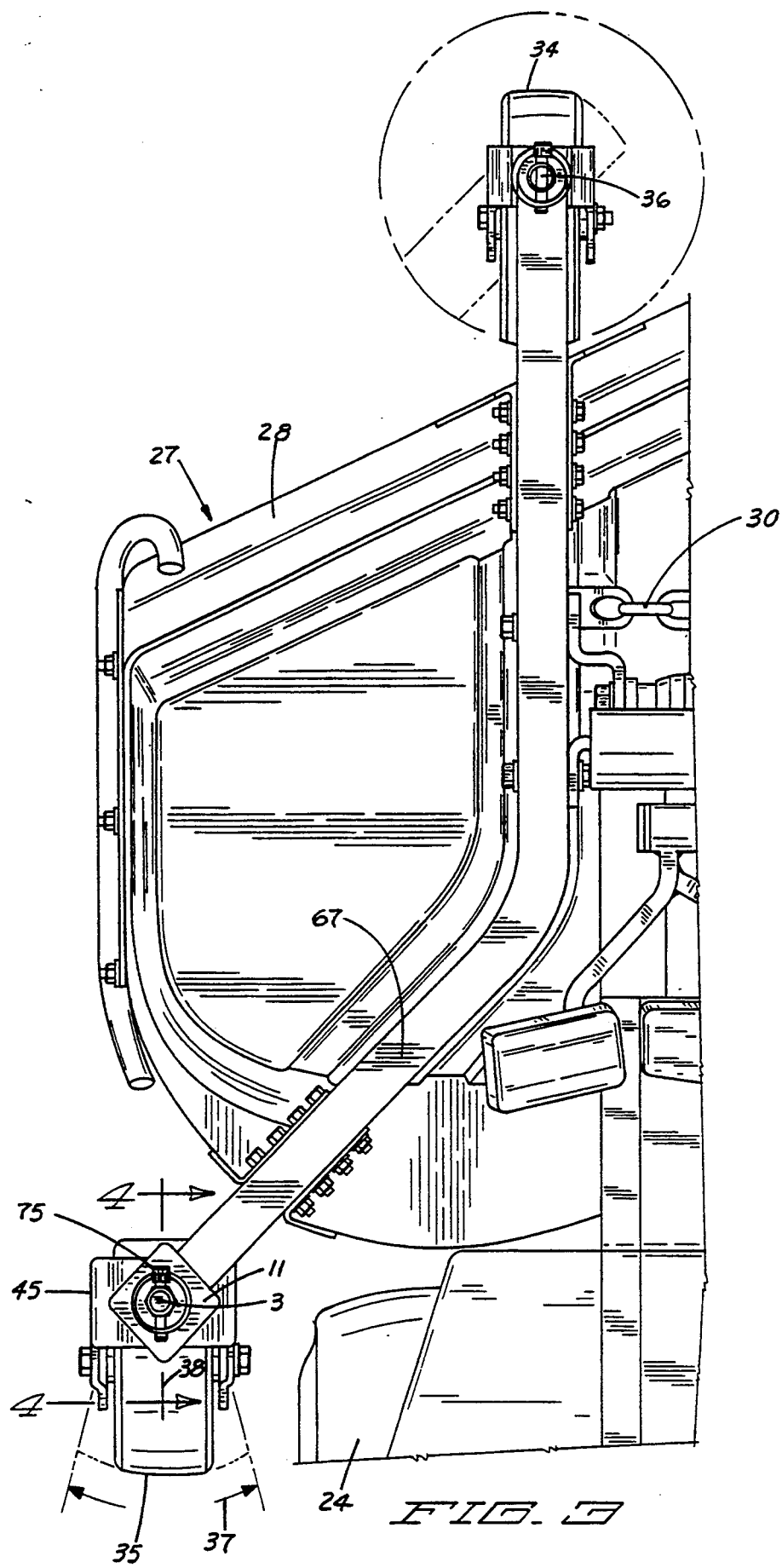
FIG. 3 is a top plan view of a portion of the mower depicted in FIG. 2.

In operation, a turning movement of mower 22 may cause substantial deflection of conventional front castering wheel 34, as seen, for example, in FIG. 3. However, rear wheel 35 is only able to undergo a substantially lesser deflection, due to the resistance of resilient material 46. For very slight turns, the deflection of front wheel 34 and rear wheel 35 may be approximately equal, insofar as the resilient material 46 offers only slight resistance to movement at small angular deflections. However, as the turn becomes greater, the resistance to angular displacement of resilient material 46 becomes disproportionately larger, thereby defining, for all practical purposes, a gradual but absolute limit on the angular deflection of rear wheel 35.

The placement of resilient material 46 within housing 11 also provides a layer of shock absorbing material between the strut 67 and lateral (i.e. not parallel to the support shaft 3) loads imposed on rear wheel 35. Additionally, rear wheel 35 is unable to spin or vibrate about shaft 3 on those occasions when rear wheel 35 loses contact with the ground.

Figure 8:
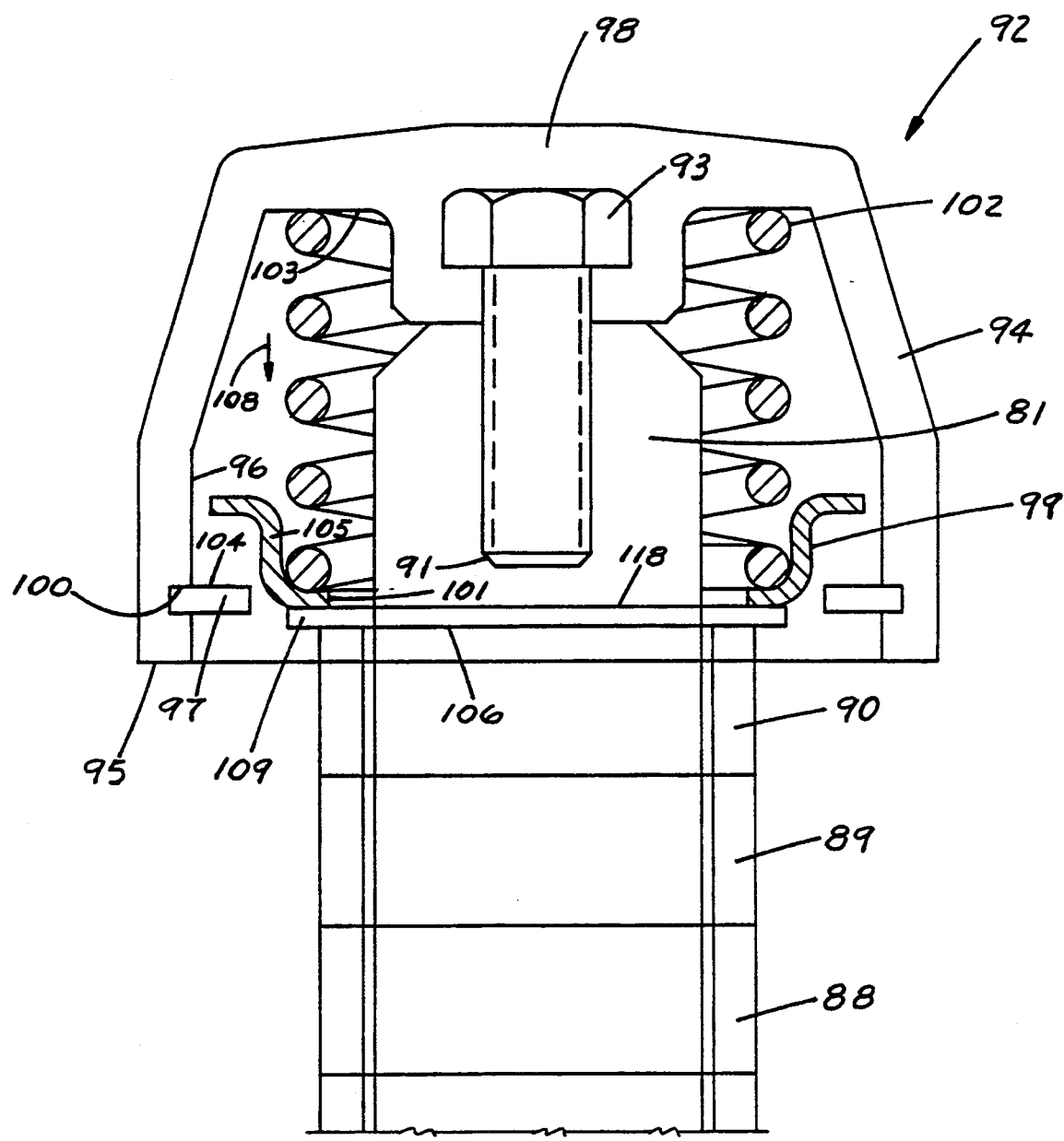
FIG. 8 is a side elevational view of a cross-section of a second embodiment of an improved caster assembly constructed in accordance with the principles of the present invention.
Figure 9:
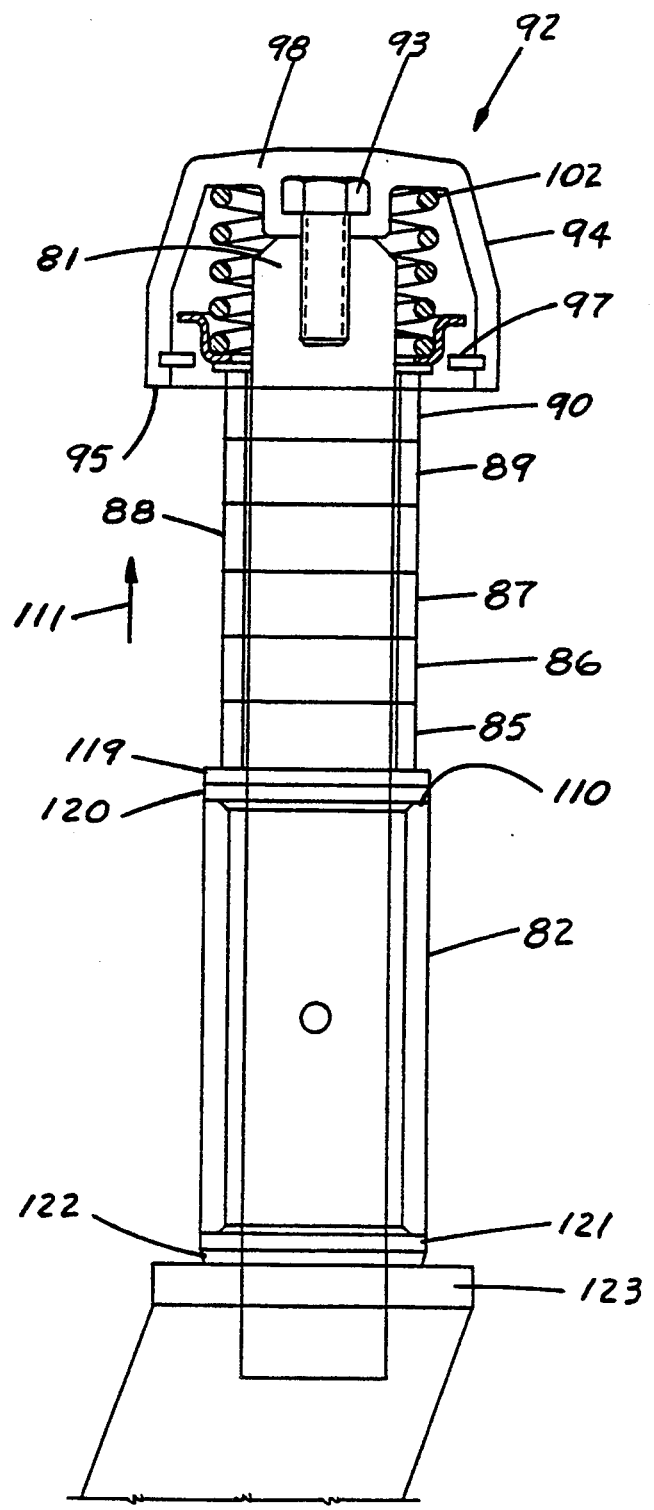
FIG. 9 is a side elevational view of the embodiment of FIG. 8 showing the relationship of the castering wheel support fork to the spring and cap assembly.

Referring now to FIGS. 8 and 9, another embodiment of the improved castering wheel of the present invention is depicted. One should recognize that this embodiment may be used as an enhancement of the previously discussed torsional resistance assembly, or may be used alone in conjunction with a castering wheel which is capable of full 360 degree rotation about its support shaft.

The support shaft 81 passes through a mower deck frame 82, which is analogous, for example, to the support shaft 83 which passes through frame 84 as depicted in FIG. 6. A series of spacers 85, 86, 87, 88, 89 and 90 is stacked coaxially about shaft 81 in a manner analogous, for example, to the spacers 70, 71, 72, 69, 73 and 74 surrounding shaft 3 as depicted in FIG. 7.

In the present embodiment, however, an end region of shaft 81 has been drilled and tapped to create a coaxial bore 91 extending into shaft 81. In a preferred embodiment, the depth of bore 91 is approximately one inch.

Still referring to FIG. 8, a cap assembly 92 is depicted, which includes a preferably plastic cap 98 into which is embedded or otherwise rigidly affixed a threaded stud 93, the stud 93 being compatibly dimensioned to permit threaded insertion into bore 91. The cap 98 is formed so as to have a sloping sidewall 94 which terminates at endwall 95. Near the end wall 95 and extending from groove 100 formed within the interior wall 96 of sidewall 94 is an internal retaining ring 97 which extends substantially continuously around the inside perimeter of cap 98 as defined by the interior wall 96. The retaining ring 97 is typically a split ring inserted into groove 100 with a tool such as specially adapted pliers.

Retained within cap 98 is a bearing plate or washer 99, the washer 99 being coaxial with stud 93 and with a diameter that contains an inner bore 101 somewhat larger than the outside diameter of shaft 81. The outside diameter of washer 99 is such that washer 99 is retained within cap 98 by the presence of retaining ring 97. A compression spring 102 is mounted within cap 98 so as to be coaxial with stud 93, the compression spring 102 tending to urge bearing plate or washer 99 away from inner surface 103 of cap 98 and toward an abutting relationship with surface 104 of retaining ring 97. The vertical sidewall 105 of washer 99 prevents spring 102 from slipping laterally away from a coaxial relationship with stud 93.

In a use position (as depicted in FIGS. 8 and 9), the stud 93 is inserted into bore 91 by rotating cap 98. When rotation of cap 98 is completed, spring 102 exerts a force in the direction of arrow 108, which tends to press bearing plate or washer 99 against the upper surface 119 of washer 109, the bottom surface 106 of washer 109 abutting spacer 90. This tends to compress the entire stack of spacers 85–90 between washer 106 and the upper surface 110 of frame 82 (perhaps through intervening washers 119 and 120, for example). Further, since the spacers 85–90 are thus rigidly compressed, a force in the direction of arrow 111 is exerted on shaft 81. Upward travel of shaft 81 is limited by spacers or washers 121 and 122, for example below frame 82, or by the presence of the castering wheel support fork 123 itself.

In this manner, shimmy and vibration are greatly reduced since the castering wheel assembly is frictionally secured to resist axial movement. Noise is not produced by rattling or vibration of the spacers insofar as the spacers are held in a rigid, abutting relationship. Some resistance to axial rotation is provided, ultimately depending on the force exerted by spring 102 and imparted as a frictional force against the abutting spacers and support fork 123. Thus, when the castering wheel loses contact with the ground in the situations discussed previously, the weight of the wheel is not sufficient to overcome the frictional resistance to axial rotation and the wheel remains stationary. Once in contact with the ground, however, the forces imparted to the wheel are sufficient to overcome the frictional resistance to rotation, and the castering wheel remains free to rotate a complete 360 degrees about its support shaft.

There are other modifications which will be apparent to those skilled in the art. Accordingly, the scope of this invention will be limited only by the appended claims.

What is claimed is:

1. For use with a mower having a traction vehicle and a cutting unit, a system for supporting and restraining torsional and lateral motion of a castering wheel associated with the cutting unit, comprising:
   (a) a torsional motion resistance mechanism, the torsional resistance mechanism being deformable about a first longitudinal axis, the torsional motion resistance mechanism being mechanically coupled to the castering wheel;
   (b) a housing, the housing connecting the torsional motion resistance mechanism to the cutting unit, the housing being rigidly affixed to the cutting unit so as to limit motion of the castering wheel relative to the housing; and
   (c) a shaft, the shaft being coaxial with the first longitudinal axis, the castering wheel being affixed to the shaft and tending to rotate about the first longitudinal axis, such that torsional rotation of the castering wheel about the first longitudinal axis is elastically limited to less than ten degrees under normal loads, the shaft thereby being biased toward a given azimuthal orientation.

2. The supporting and restraining system of claim 1, wherein the torsional motion resistance mechanism further comprises:
   (a) a resilient member, the resilient member biasing the shaft toward a neutral position, the resilient member being formed so as to abut at least a portion of an interior surface of the housing; and
   (b) a sleeve, the sleeve forming a longitudinal bore, the longitudinal bore extending through the housing, the longitudinal bore thereby slidably retaining the shaft within the housing.

3. The supporting and restraining system of claim 2, wherein the housing is formed as a substantially rectangular container, the container having sidewalls, at least one sidewall being rigidly affixed to the cutting unit.

4. The supporting and restraining system of claim 3, wherein the sidewalls are rigidly affixed to a lid, the lid serving to prevent the resilient member from exiting the housing.

5. The supporting and restraining system of claim 4, wherein rotation of the castering wheel, when the castering wheel is subjected to normal loads, is limited by the torsional motion resistance mechanism to an angular displacement of less than ten degrees from a neutral position.

6. A system of preventing scuffing of turf by castering wheels affixed to cutting units of rotary lawn mowers, comprising:
   (a) a castering wheel fork, the castering wheel rotating about an axle supported by the castering wheel fork;
   (b) a castering wheel shaft, the castering wheel shaft being affixed to the castering wheel fork, the castering wheel shaft being rotatable about a first longitudinal axis defined by the castering wheel shaft, the castering wheel shaft being movable in any direction; and
   (c) a rotation resistance mechanism, the rotation resistance mechanism being rigidly affixed to the cutting unit, the rotation resistance mechanism being adapted to receive the castering wheel shaft, thereby resisting movement of the castering wheel shaft relative to the cutting unit.

7. The system of claim 6, wherein the rotation resistance mechanism further comprises a housing, the housing being formed as a bottomless box having sidewalls and a lid, the lid being formed so as to have a centrally disposed orifice through which the castering wheel shaft extends.

8. The system of claim 7, wherein the rotation resistance mechanism further comprises a resilient member, the resilient member being substantially confined within the housing, the resilient member being adapted to laterally grip the castering wheel shaft, thereby causing axial rotation of the castering wheel shaft to be impeded by the resilient member.

9. The system of claim 8, wherein the rotation resistance mechanism further comprises a sleeve, the sleeve being bonded to and passing through the resilient member, thereby defining a central bore through the resilient member, the castering wheel shaft being longitudinally slidably retained by the sleeve.

10. The system of claim 9, wherein the resilient member is composed substantially of rubber like material.

11. A device for suppressing noise and resisting free rotation of a castering wheel about a support shaft cooperatively connected to a Lawn mower deck by at least one height of cut washer, comprising:
   (a) a threaded stud, the threaded stud being inserted by rotation of the stud into a drilled and tapped axial bore residing in an upper end of the support shaft adjacent to the height of cut washer;
   (b) a cap, the threaded stud being rigidly affixed to a first interior surface of the cap;
   (c) a bearing plate, the bearing plate being retained within an interior region of the cap; and
   (d) a biasing member, the biasing member being retained within the cap, the biasing member urging the bearing plate away from the first interior surface of the cap, such that rotation of the cap controls a frictional force between the bearing plate and the height of cut washer.

12. The device of claim 11, wherein the cap further comprises:
   (a) an axial bearing surface;
   (b) a substantially continuous sidewall, the sidewall being integrally formed with and surrounding the axial bearing surface; and
   (c) a retaining ring, the retaining ring having at least some portion being substantially perpendicular to the sidewall, the retaining ring being formed so as to abut an interior perimeter defined by the sidewall, the retaining ring being dimensioned so as to retain the bearing plate within the interior region of the cap.

13. The device of claim 12, wherein the biasing means is a spring, the spring being retained within the interior region of the cap, a first end of the spring abutting the first interior surface of the cap, a second end of the spring abutting the bearing plate.

14. The device of claim 13, further comprising a guide washer, the guide washer being affixed to the bearing plate, the guide washer being adapted to resist lateral displacement of the spring.

15. A method of resisting free movement of a castering wheel affixed to a mower cutting unit, comprising the steps of:
   (a) affixing a castering wheel mounting strut to the mower cutting unit;
   (b) forming a motion resisting mechanism so as to have a central bore and capable of limiting a shaft to one degree of freedom;
   (c) rigidly affixing the motion resisting mechanism to the mounting strut; and
   (d) inserting a castering wheel support shaft into the central bore, thereby resisting all movement of the castering wheel support shaft.

16. The method of claim 15, further comprising the step of forming the motion resisting mechanism as castering wheel support shaft tensioning device, thereby urging the castering wheel into stable contact with the mounting strut.

17. The method of claim 15, further comprising the steps of:
   (a) forming the motion resisting mechanism to include a resilient member having a central bore;
   (b) fixedly retaining the resilient member within a housing; and
   (c) rigidly affixing the housing to the mounting strut.

18. The method of claim 17, further comprising the steps of:
   (a) bonding a sleeve to the resilient member; and
   (b) forming a cross-sectional profile of the sleeve to match a cross-sectional profile of the castering wheel support shaft.

19. The method of claim 18, further comprising the step of forming the cross-sectional profile of the sleeve as a hexagon.

20. The method of claim 19, further comprising the step of biasing the resilient member to assume a given azimuthal orientation.

* * * * *